United States Patent [19]

Danne et al.

[11] Patent Number: 4,589,527
[45] Date of Patent: May 20, 1986

[54] AUTOMATIC ADJUSTING DEVICE FOR A BRAKE

[75] Inventors: Ulrich W. Danne, Bendorf-Sayn; Helmut Heibel, Moschheim, both of Fed. Rep. of Germany

[73] Assignee: Lucas Industries public limited company, Birmingham, England

[21] Appl. No.: 555,968

[22] Filed: Nov. 29, 1983

[30] Foreign Application Priority Data

Dec. 3, 1982 [DE]  Fed. Rep. of Germany ....... 3244872

[51] Int. Cl.⁴ ............................................. F16D 65/56
[52] U.S. Cl. ........................ 188/79.5 GE; 188/196 V
[58] Field of Search .................. 188/79.5 R, 79.5 GE, 188/79.5 GC, 79.5 GT, 79.5 P, 79.5 S, 79.5 SC, 196 R, 196 C, 196 P, 196 D, 196 V, 196 BA; 192/111 A

[56] References Cited

U.S. PATENT DOCUMENTS

| 2,184,683 | 12/1939 | Shuman | 188/79.5 GE |
| 2,562,354 | 7/1951 | Gates | 188/79.5 S |
| 4,232,766 | 11/1980 | Rupprecht | 188/79.5 P |

FOREIGN PATENT DOCUMENTS

| 2350235 | 5/1974 | Fed. Rep. of Germany | |
| 2538328 | 3/1976 | Fed. Rep. of Germany | 188/79.5 R |
| 2606925 | 9/1976 | Fed. Rep. of Germany | 188/79.5 GE |
| 3218788 | 12/1982 | Fed. Rep. of Germany | |
| 57-8975 | 2/1982 | Japan | |
| 2099525 | 12/1982 | United Kingdom | 188/79.5 R |

*Primary Examiner*—Bruce H. Stoner, Jr.
*Assistant Examiner*—Richard R. Diefendorf
*Attorney, Agent, or Firm*—Scrivener Clarke Scrivener and Johnson

[57] ABSTRACT

A strut (40), whose effective length depends on the relative positions of two strut portions (42,44) adjustable with respect to each other is connected in parallel with a brake actuating mechanism (18). One strut portion (44) has at least one part adjustable transversely of the longitudinal direction of the strut (40) and upon actuation of the brake tends to increase the length of the strut (40). This strut portion (44) has an operable connection with an intermediate member (24) which is supported on one of two structural members (128, 136) transmitting the actuating force independently of the strut (40) for rotation around the axis (B) of the brake actuating device (18) and is rotatable against the frictional resistance thereof only as long as this does not surpass a given value. In this way, the strut (40) is prevented from unnecessary or over-adjustment upon particularly forceful actuation of the brake.

6 Claims, 7 Drawing Figures

AUTOMATIC ADJUSTING DEVICE FOR A BRAKE

The invention relates to an automatic adjusting device for a brake, in particular a motor vehicle brake in which a strut, whose effective length depends on the relative positions of two strut portions adjustable with respect to each other, is connected in parallel with a brake actuating mechanism, one of said strut portions having at least one part adjustable transversely of the longitudinal direction of the strut, upon actuation of the brake tending to increase the length of the strut with this part having an operative connection with an intermediate member which is disposed between two structural members transmitting the actuating force independently of the strut and which is rotatable against the frictional resistance between the structural members and the intermediate member to enable said part to adjust transversely, provided said resistance does not surpass a given value.

The subject matter of the parent German Pat. No. 32 18 788 has eliminated the danger that, in an adjusting device of this type, adjustment should occur due to excessive brake actuation resulting in an elastic deformation of various parts of the brake although the actual state of wear of the brake linings would not yet justify such an adjustment. According to the parent patent, the intermediate member can be either displaceable in a straight line or rotatable about an axis. If the intermediate member is rotatable, it can be formed as a gear wheel and be supported for rotation on an arm projecting away from the strut in accordance with an example of embodiment shown in FIGS. 5 and 6 of the parent patent. In this case, the strut has three strut portions, two of which are screwed together and of these, one is fixed against rotation and the other is formed as a pinion and is provided in addition with ratchet teeth. A pivotable pawl engages with the ratchet teeth, said pawl gradually rotating the strut portion concerned and thus screwing it out of the other strut portion when adjustment is necessary. The pinion engages with the intermediate member formed as gear wheel which is essentially free to rotate upon normal brake actuation but upon particularly forceful brake actuation is clamped between a piston of the hydraulic brake actuating mechanism and an adjacent brake shoe end.

It is an object of the present invention to show further examples of use and embodiment of the subject matter of the parent patent.

According to the invention, an automatic adjusting device of the type described at the outset is further developed in that the intermediate member is supported for rotation on one of the two structural members transmitting the actuating force.

Thus, according to the invention, the intermediate member is supported on one of those structural members between which it is to be clamped when the actuating force of the brake actuating mechanism—generally hydraulic—surpasses a given value. The method according to the invention of supporting the intermediate member simplifies the adjusting device as the arm projecting away from the strut according to FIG. 5 of the parent patent provided to support the intermediate member can be dispensed with.

The invention may be used in connection with various known struts, for instance, with the strut shown in FIGS. 5 and 6 of the parent patent which has two strut portions screwed to each other. Uses of the invention on struts of other construction are the subject of further examples of embodiment described below.

Particularly simple developments of the invention result if the intermediate member is rotatable about the axis of the brake actuating mechanism.

A development of this kind can be realised in an adjusting device which, for instance, conforms with the example of embodiment shown in FIGS. 7 and 8 of the parent patent in that one of the two structural members, between which the intermediate member is disposed, is the head of a plunger which is guided for axial displacement in the other one of these two structural members and is supported by means of a spring which tends to maintain a spacing larger than the thickness of the intermediate member between the head and the other structural member. In this case, it is expedient if in accordance with the invention, the intermediate member is supported for rotation on the plunger itself.

From the embodiment shown in FIGS. 7 and 8 of the parent patent in which the intermediate member is component of a gear drive, results a variation according to the present invention in which the intermediate member is a toothed sector whose toothing engages a face toothing on one of the strut portions, this strut portion being rotatable in a manner known per se (DE No. 23 50 235 B2) on the other strut portion around an axis of rotation disposed transversely of the longitudinal direction of the strut and having an eccentric outer surface whose position determines the total length of the strut.

It is particularly advantageous if the intermediate member is formed by an annular central area of a cam plate with a spiral outer area and forms together with this one of the strut portions. This development of the invention simplifies considerably the automatic adjusting device as a whole as one of the strut portions is combined with the intermediate member to form one single structural member which is relatively simple to manufacture.

Examples of embodiment of the invention are described in greater detail below with reference to diagrammatic drawings in which.

Figure 1:
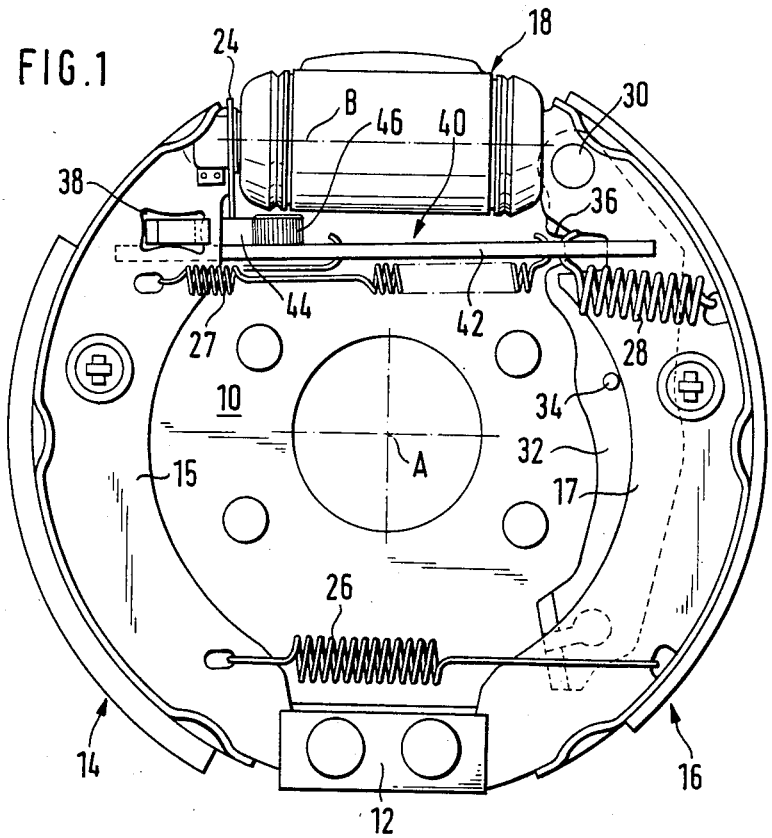
FIG. 1 is a plan view of an internal shoe-drum brake for motor vehicles.
Figure 4:
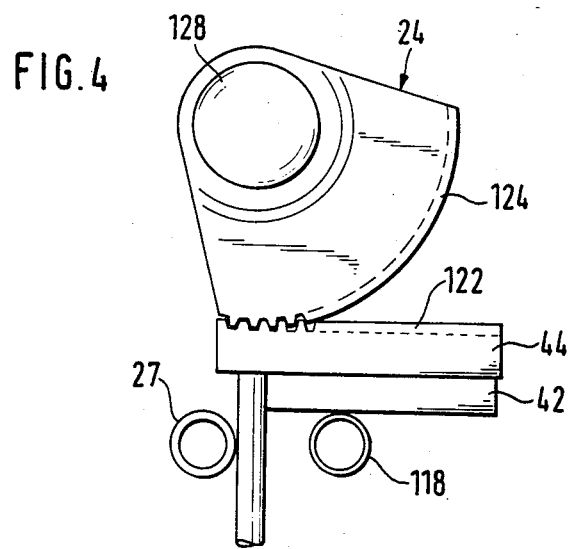
FIG. 4 is cross-section IV—IV of FIG. 2.

The internal shoe-drum brake shown in FIGS. 1 to 4 has a plate-shaped or dish-shaped brake carrier member 10 which is provided for fixing to a rear-wheel axle of a motor vehicle and in installed condition is enclosed by a brake drum. The brake drum is not shown; its axis is referred to in the following as axis A of the drum brake. In FIG. 1 at the bottom a thrust bearing 12 is fixed to the brake carrier member 10 and on said thrust bearing 12 two brake shoes 14 and 16 having T-formed cross-sections are supported pivotably each by the lower end of a brake shoe web 15 and 17 respectively.

Figure 2:
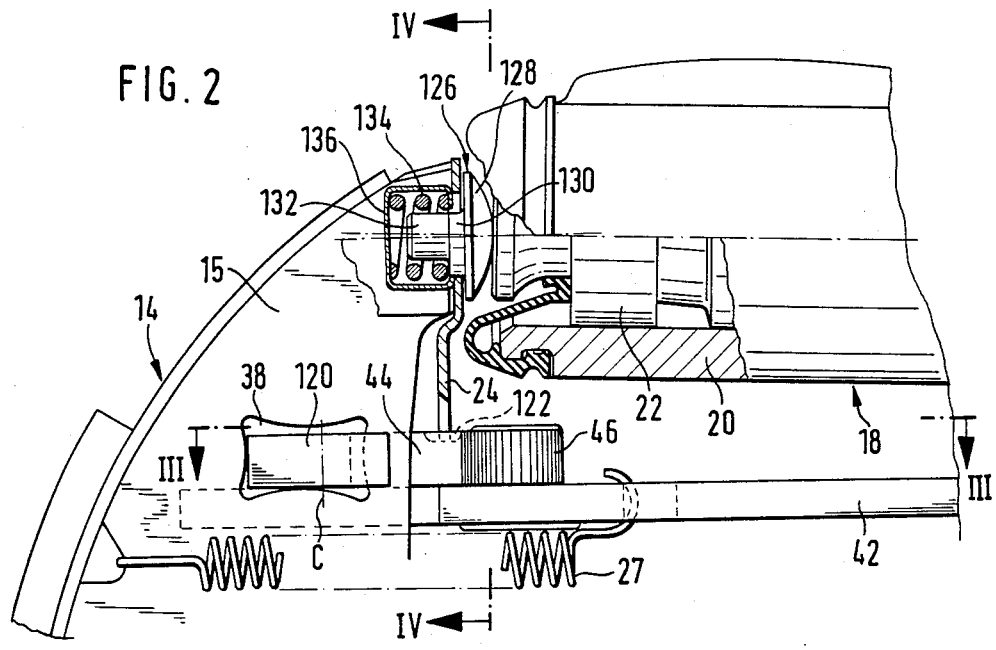
FIG. 2 is an enlarged section of FIG. 1.
Figure 3:
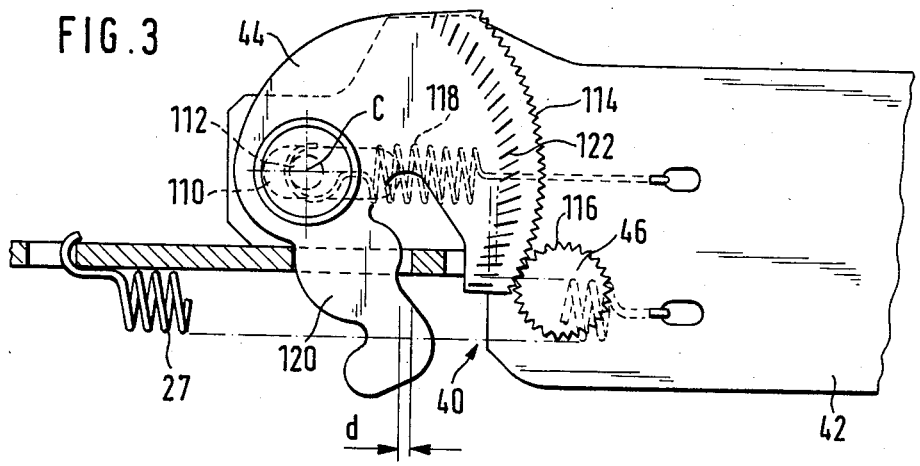
FIG. 3 is cross-section III—III of FIG. 2.

Between the upper ends of the brake shoe webs 15 and 17, a hydraulic brake actuating mechanism 18 is disposed diametrically opposite the thrust bearing 12. The principal components of this brake actuating mechanism are a double-ended open cylinder 20 with the axis B, said cylinder being fixed to the brake carrier member 10 and having two pistons 22, one of which is shown in FIG. 2. A plate-shaped intermediate member 24 is supported coaxially with this piston 22 on the upper end of the brake shoe web 15 in a manner described in detail below. The other piston, which is masked in the drawings, lies directly at the upper end of the brake shoe web 17.

The two brake shoes 14 and 16 are biased by three return spings 26, 27 and 28 against the thrust bearing 12 and the brake actuating mechanism 18.

At the upper end of the brake shoe web 17, a rivet 30 supports a lever 32 which forms part of a mechanical brake actuating mechanism and, as long as this is inoperative, abuts the brake shoe web 17 with a stop 34 formed thereon, as shown in FIG. 1. At a distance from the rivet 30, a notch 36 is formed in the lever 32 and this is positioned opposite a recess 38 in the brake shoe web 15. A strut 40 is supported in the notch 36 and the recess 38 and is composed of three strut portions, i.e., of a rod-shaped strut portion 42, a disc-shaped strut portion 44 and a conical strut portion 46.

The rod-shaped strut portion 42 is connected to the brake shoe web 15 by means of the relatively long and not particularly strong return spring 27 and is also connected to brake shoe web 17 by the considerably shorter and stronger return spring 28. The end of the strut portion 42 which is on the right-hand side in FIG. 1 is slotted and engages in the notch 36 of the brake shoe web 17. The other end of the rod-shaped strut portion 42 at the left of FIG. 1 is guided for displacement between the brake carrier member 10 and the brake shoe web 15 in longitudinal direction of the strut 40 and has a slot 110 which extends in longitudinal direction of the strut 40 and receives an axle journal 112 riveted to the disc-shaped strut portion 44.

The axle journal 112 forms an axis of rotation C which extends at right angles to the longitudinal direction of the strut 40 and thus also at right angles to the axis B of the cylinder 20 and also at right angles to axis A of the drum brake. The disc-shaped strut portion 44 has an eccentric or spiral outer surface part 114 with respect to the axle journal 112 and said outer surface part 114 extends approximately over a quadrant and is grooved in parallel to the axis of rotation C.

The conical strut portion 46 is riveted to the rod-shaped strut portion 42 and has a correspondingly grooved cylindrical outer surface part 116 on which the disc-shaped strut portion 44 supports itself with its outer surface part 114. The axle journal 112 is connected to the rod-shaped strut portion 42 by a further return spring 118 which tends to hold the outer surface parts 114 and 116 together.

The disc-shaped strut portion 44 also has an arm 120 which extends substantially radially away from the axle journal 112 and engages through the recess 38 in which it has a defined clearance d in longitudinal direction of the strut 40. This clearance d corresponds to the distance the brake shoes 14 and 16 can be spread apart by the brake actuating mechanism 20 without an adjustment taking place. If this distance is surpassed, the left brake shoe 14 takes with it to the left the disc-shaped strut portion 44 while the rod-shaped strut portion 42 moves together with the right brake shoe 16 to the right. As a result, the grooved outer surface parts 114 and 116 of the strut portions 44 and 46 separate and the force exerted on the arm 120 by the brake shoe web 15 effects a rotation of the disc-shaped strut portion 44 by several degrees about the axle journal 112. This in turn has the result that on release of the brake a portion of the outer surface 114 further away from the axis of rotation C comes to rest against the outer surface part 116.

In order to avoid over-adjustment, a face toothing 122 is formed on the disc-shaped strut portion 44 and extends in accordance with the outer surface part 114 approximately over a quadrant but is arranged so as to be concentric with the axis of rotation C. The face toothing 122 engages with a radial toothing 124 on the intermediate member 24 which is constructed as a toothed sector and is supported on a plunger 126 for rotation about the axis B of the cylinder 20.

The plunger 126 has a hemispherical head 128, a neck 130 of smaller diameter and a shaft 132 of even smaller diameter. The shaft 132 is received in a helical compression spring which is accommodated with axial bias in a cage 136 at the upper end of the brake shoe web 15. The cage 136 is hollowed out from the brake shoe web 15 in one piece or is fixed to the same, e.g., welded to it.

The neck 130 of the plunger 126 is supported in the direction of axis B on the compression spring 134 and its length is rather greater than the thickness of the portion of the intermediate member 24 situated between the head 128 and the cage 136 or the upper end of the brake shoe web 15. Thus, the intermediate member 24 is supported on the plunger 126 for rotation around the axis B provided the force exerted by the left piston 22 of the brake actuating mechanism 18 is less than the force of the axial bias of the compression spring 134.

However, when the force exerted by the piston 22 during forceful brake actuation exceeds that of the compression spring 134, said compression spring yields and the intermediate member 24 is clamped between the head 128 of the plunger 126 and the cage 136 or upper end of the brake shoe web 15. The intermediate member 24 can thus no longer rotate and then the disc-shaped strut portion 44 is also prevented from rotating about its axle journal 112 by the mutual engagement of the toothings 122 and 124. In this way, adjustment of the strut 40 is prevented when the brake actuating force exceeds a value predetermined by the bias of the compression spring 134.

In order to increase the effect of the yieldable support of the plunger 126 described, this can be fixed against rotation in the cage 136, e.g., by the cage 136 having edge portions which are curved radially inwards and each engage with a longitudinal groove in the neck 130. The underside of the head 128 and/or the surface of the intermediate member 24 facing it can be radially grooved so that when the compression spring 134 yields, the head 128 interacts not just with frictional contact but in positive manner with the intermediate member 24 in order to prevent this from rotating. For the same purpose, the upper end of the brake shoe web 15 and/or the surface of the intermediate member 24 assigned thereto can also be grooved radially in relation to the plunger 126.

Figure 5:
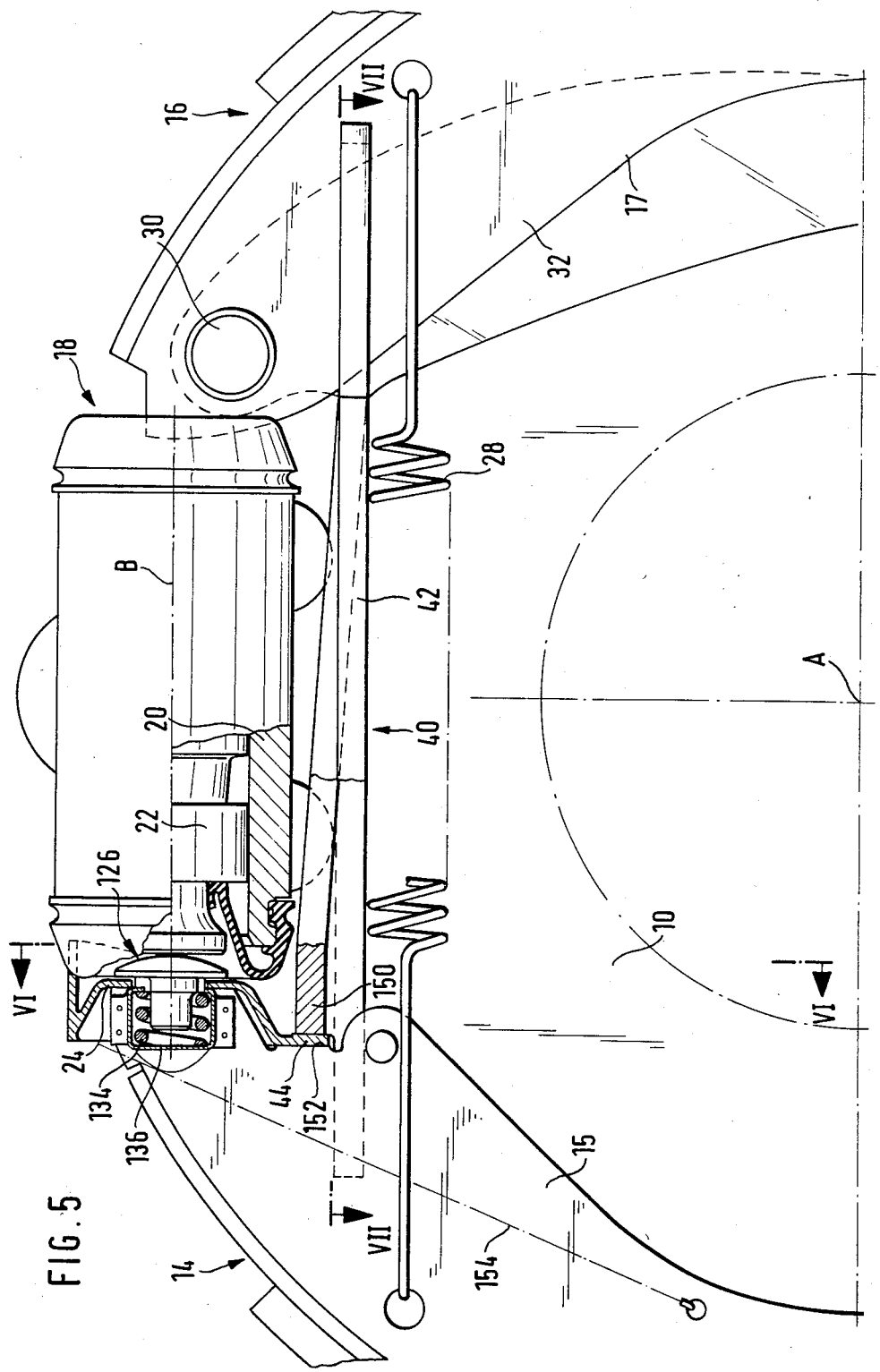
FIG. 5 is a partial plan view of another internal shoe-drum brake for motor vehicles.
Figure 6:
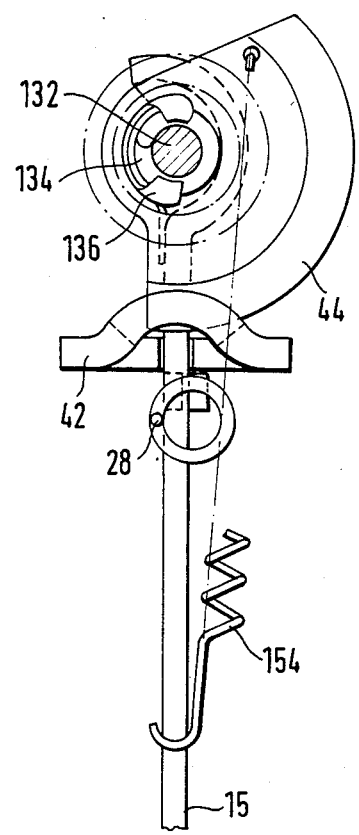
FIG. 6 is cross-section VI—VI of FIG. 5
Figure 7:
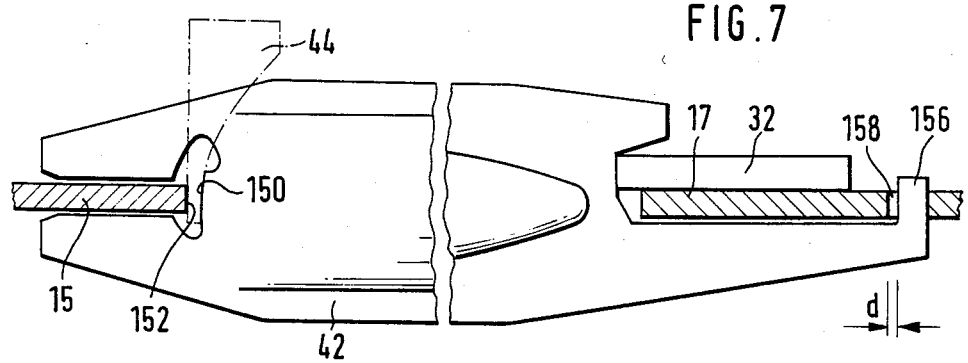
FIG. 7 is cross-section VII—VII of FIG. 5.

The internal shoe-drum brake according to FIGS. 5 to 7 is largely comparable with that according to FIGS. 1 to 4 and is therefore only partially shown; the same or similar components are provided with the same reference numbers. The adjusting device shown in FIGS. 5 to 7 only is described below and this only in so far as it differs from the device shown in FIGS. 1 to 4.

The strut 40 according to FIGS. 5 to 7 consists only of a rod-shaped strut portion 42 and a disc-shaped strut portion 44. The rod-shaped strut portion 42 embraces fork-like the brake shoe web 15 and has an upwardly bent thrust bearing 150. Between this thrust bearing 150 and a bearing surface 152 formed on the brake shoe web 15, is a portion of the disc-shaped strut portion 44 whose surface resting against the bearing surface 152 is a plane surface part while the surface resting against the thrust bearing 150 ascends in the form of a spiral with radial clearance around the axis B; the disc-shaped strut portion 44 is thus constructed as an axial cam plate.

Between the disc-shaped strut portion 44 and the brake shoe web 15, a return spring 154 is clamped such that its longitudinal axis keeps a marked radial distance in every possible operating position from the plunger 126 whose axis at least approximately conforms with the axis B of the cylinder 20. As a result of this arrangement, the return spring 154 exerts a torque which tends to rotate the integral member consisting of intermediate member 24 and the disc-shaped strut portion 44 around the plunger 126 and moreover, in such a manner that the strut portion 44 pushes wedge-like between thrust bearing 150 and bearing surface 152 and thus enlarges the effective length of the strut 40.

This enlargement of the effective length of the strut 40 occurs each time the clearance d is exceeded due to wear of the brake linings when the drum brake is actuated by means of the hydraulic brake actuating mechanism 18. The clearance d is determined according to FIG. 7 by means of the fact that a projection 156 formed on the right end of the rod-shaped strut portion 42 engages with a correspondingly larger recess 158 in the brake shoe web 17.

However, when the force exerted by the brake actuating mechanism 18 via the plunger 126 and the compression spring 134 on the brake shoe 14 exceeds the bias of the compression spring 134 during particularly forceful brake actuation, the intermediate member 24 is clamped between the head 128 of the plunger 126 and the cage 136 or brake shoe web 15 as in the embodiment shown in FIGS. 1 to 4. Due to the intermediate member 24 and the disc-shaped strut portion 44 being integral in the embodiment according to FIGS. 5 to 7, this has the direct result that the disc-shaped strut portion 44 can no longer rotate and thus adjustment of the strut 40 does not take place.

In some cases, protection against over-adjustment can be dispensed with, e.g., because all structural members loadable by the brake actuating mechanism are so amply dimensioned that they cannot markedly deform even during particularly forceful brake actuation. In such cases, as variation on FIGS. 5 to 7, the compression spring 134 and the cage 136 can be replaced by a rigid support for the plunger 126 on the brake shoe 14. The plunger 126 then has only the function of a journal on which the strut portion 44 is supported for rotation without ever being clamped between the piston 22 and the brake shoe 14. Both examples of embodiment shown in the drawings and the variation on FIGS. 5 to 7 described above can be modified in that plunger 126 and spring 134 are guided in the piston 22, similar to the embodiment shown in FIGS. 7 and 8 of the parent patent, 32 18 788.

What is claimed is:

1. An automatic adjusting device for a brake, in particular a motor vehicle brake comprising a strut, whose effective length depends on the relative positions of two strut portions adjustable with respect to each other, said strut being connected in parallel with a brake actuating mechanism, one of said strut portions having at least one part transversely movable and adjustable transversely with respect to the longitudinal axis of the strut and having a camming means engaging with the other strut portion and which, upon actuating of the brake by an actuating force, tends to increase the length of the strut, said part having an operative connection with an intermediate member which is disposed between two structural members transmitting the actuating force independently of the strut and which is rotatable against the frictional resistance between the structural members and the intermediate member to enable said part to adjust transversely, provided said resistance does not surpass a given value, said intermediate member being supported for rotation on one of the two said structural members transmitting the actuating force.

2. The adjusting device according to claim 1, wherein the intermediate member is rotatable around the axis of the brake actuating mechanism.

3. The adjusting device according to claim 2, wherein one of said two structural members, between which said intermediate member is disposed, is a head of a plunger guided for axial displacement in the other one of the two structural members and supported by means of a spring tending to maintain a spacing larger than the thickness of the intermediate member between the head and the other structural member, said intermediate member being supported for rotation on said plunger itself.

4. The adjusting device according to claim 2, wherein said intermediate member is a toothed sector whose toothing engages a face toothing on one of said strut portions, this strut portion being rotatable on the other strut portion around an axis of rotation disposed transversely of the longitudinal direction of the strut and having an eccentric outer surface whose position determines the total length of the strut.

5. The adjusting device according to claim 1, wherein said intermediate member is formed by an annular central area of a cam plate having an outer surface and which defines one of said strut portions, said outer surface including a spiral surface defining said part which is adjustable transversely to increase the length of said strut.

6. An automatic adjusting device for a brake, in particular a motor vehicle brake comprising a strut, whose effective length depends on the relative positions of two strut portions adjustable with respect to each other, said strut being connected in parallel with a brake actuating mechanism actuated by an actuating force, one of said strut portions having at least one part adjustable transversely of the longitudinal direction of the strut, and upon actuating of the brake tending to increase the length of the strut, said strut part being constructed as an axial cam plate rotatable around the axis of said brake actuating mechanism and being fixed to an intermediate member which is disposed between two structural members transmitting the actuating force independently of the strut, said intermediate member being rotatable against the frictional resistance between the structural members and the intermediate member, provided said resistance does not surpass a given value.

* * * * *